(12) United States Patent
Fujita

(10) Patent No.: US 8,529,683 B2
(45) Date of Patent: Sep. 10, 2013

(54) REVERSIBLE THERMAL DISCOLORATION AQUEOUS INK COMPOSITION AND WRITING IMPLEMENT USING THE SAME AND WRITING IMPLEMENT SET

(75) Inventor: Katsuyuki Fujita, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 516 days.

(21) Appl. No.: 12/919,543

(22) PCT Filed: Feb. 26, 2009

(86) PCT No.: PCT/JP2009/054100
§ 371 (c)(1),
(2), (4) Date: Aug. 26, 2010

(87) PCT Pub. No.: WO2009/107855
PCT Pub. Date: Sep. 3, 2009

(65) Prior Publication Data
US 2011/0008095 A1  Jan. 13, 2011

(30) Foreign Application Priority Data

Feb. 29, 2008 (JP) ................................. 2008-049303
Jul. 24, 2008 (JP) ................................. 2008-190422

(51) Int. Cl.
*C09D 11/00* (2006.01)
*C09D 11/16* (2006.01)

(52) U.S. Cl.
USPC ...................... 106/31.32; 106/31.64; 401/195

(58) Field of Classification Search
USPC ............................ 106/31.32, 31.64; 401/195
See application file for complete search history.

(56) References Cited

U.S. PATENT DOCUMENTS

| | | |
|---|---|---|
| 4,421,560 A | 12/1983 | Kito et al. |
| 5,527,385 A | 6/1996 | Sumii et al. |
| 6,114,412 A | 9/2000 | Kanbayashi et al. |

(Continued)

FOREIGN PATENT DOCUMENTS

| | | |
|---|---|---|
| EP | 1 323 540 | 7/2003 |
| JP | 11-335613 | 12/1999 |

(Continued)

OTHER PUBLICATIONS

U.S. Appl. No. 13/390,550 to Katsuyuki Fujita., filed Feb. 15, 2012.
Japanese Office Action with respect to Japanese App. No. 2008-190422, mailed May 31, 2013, with translation.

*Primary Examiner* — Kaj K Olsen
*Assistant Examiner* — Veronica F Faison
(74) *Attorney, Agent, or Firm* — Greenblum & Bernstein, P.L.C.

(57) ABSTRACT

To provide a reversible thermal discoloration aqueous ink composition which is capable of suppressing the lightening and deepening of handwriting at the time when a writing implement containing the reversible thermal discoloration aqueous ink composition in the barrel, and particularly, which does not lighten the color of handwriting with time in an erecting state or does not lighten the color of handwriting by the application of vibration at transportation or at the time when it is carried on in an erecting state, as well as a writing implement using the same and a writing implement set.

A reversible thermal discoloration aqueous ink composition comprising water, a reversible thermal discoloration microcapsule pigment including a reversible thermal discoloration composition composed of (A) an electron donative coloring organic compound, (B) an electron accepting compound and (C) a reaction medium which determines a temperature at which color reactions of the both compounds occur, a polymer flocculant, a comb-type polymer dispersant having a carboxyl group at the side chain, an organic nitrogen sulfur compound, and a water-soluble resin; a writing implement 1 using the ink composition; and a writing implement set comprising the writing implement and a frictional body.

14 Claims, 5 Drawing Sheets

(56) References Cited

U.S. PATENT DOCUMENTS

| | | | |
|---|---|---|---|
| 2003/0122113 A1 | 7/2003 | Senga et al. | |
| 2007/0189836 A1* | 8/2007 | Senga et al. | 401/195 |
| 2008/0124164 A1* | 5/2008 | Ito et al. | 401/195 |
| 2010/0098475 A1* | 4/2010 | Fujita et al. | 401/1 |
| 2012/0141188 A1* | 6/2012 | Fujita | 401/261 |

FOREIGN PATENT DOCUMENTS

| | | |
|---|---|---|
| JP | 2004-175852 | 6/2004 |
| JP | 2006-117805 | 5/2006 |
| JP | 2008-031314 | 2/2008 |
| WO | 2009/008436 | 1/2009 |

* cited by examiner

REVERSIBLE THERMAL DISCOLORATION AQUEOUS INK COMPOSITION AND WRITING IMPLEMENT USING THE SAME AND WRITING IMPLEMENT SET

TECHNICAL FIELD

The present invention relates to a reversible thermal discoloration aqueous ink composition and a writing implement using the same and a writing implement set.

BACKGROUND ART

Hitherto, there is disclosed an inner-wadding type writing implement wherein an ink occlusion body is impregnated with a reversible thermal discoloration aqueous ink composition capable of forming handwriting whose color tone changes depending on a change in temperature and is housed in a barrel (see, e.g., Patent Document 1).

The above reversible thermal discoloration aqueous ink composition solves a problem that a reversible thermal discoloration microcapsule pigment is gradually flocculated and precipitated in the ink occlusion body owing to a difference in specific gravity between the reversible thermal discoloration microcapsule pigment and a vehicle and hence handwriting is lightened or deepened in color depending on the state where a pen body is downward (an inverted state) or upward (an erecting state), and solves the problem by incorporating a water-soluble polymer flocculant into the ink to make the microcapsule pigment suspended in a loose flocculated state through a loose crosslinking action of the polymer flocculant.

However, it is difficult to completely suppress the lightening and deepening in color of handwriting attributable to the difference in specific gravity between the microcapsule pigment and the vehicle merely by incorporating the polymer flocculant. Particularly, it is desired to develop a means for preventing handwriting from lightening with time in an erecting state or from lightening induced by the application of vibration at transportation or at the time when it is carried on in an erecting state.
[Patent Document 1] JP-A-11-335613

DISCLOSURE OF THE INVENTION

The invention intends to provide a reversible thermal discoloration aqueous ink composition which is capable of suppressing the lightening and deepening of handwriting at the time when a writing implement containing the reversible thermal discoloration aqueous ink composition in the barrel is used, and particularly, which does not lighten the color of handwriting with time in an erecting state or does not lighten the color of handwriting by the application of vibration at transportation or at the time when it is carried on in an erecting state, as well as a writing implement using the same and a writing implement set.

The invention intends to solve the afore-mentioned problem of a reversible thermal discoloration aqueous ink composition and a writing implement using the same.

Namely, the present invention is the following constitution.
(1) A reversible thermal discoloration aqueous ink composition comprising:
water,
a reversible thermal discoloration microcapsule pigment including a reversible thermal discoloration composition comprising:
(A) an electron donative coloring organic compound,
(B) an electron accepting compound, and
(C) a reaction medium which determines a temperature at which color reactions of the both compounds occur,
a polymer flocculant,
a comb-type polymer dispersant having a carboxyl group at the side chain,
an organic nitrogen sulfur compound, and
a water-soluble resin.
(2) The reversible thermal discoloration aqueous ink composition according to the above (1), wherein the organic nitrogen sulfur compound is a compound selected from 2-(4-thiazoyl)-benzimidazole, 2-(thiocyanatomethylthio)-1,3-benzothiazole, 2-methyl-4-isothiazolin-3-one, and 5-chloro-2-methyl-4-isothiazolin-3-one.
(3) The reversible thermal discoloration aqueous ink composition according to the above (1) or (2), wherein the mass ratio of the comb-type polymer dispersant having a carboxyl group at the side chain to the organic nitrogen sulfur compound is from 1:1 to 1:10.
(4) The reversible thermal discoloration aqueous ink composition according to the above (1), wherein the pH of the ink composition falls within the range of 3 to 7.
(5) The reversible thermal discoloration aqueous ink composition according to the above (4), which uses a water-soluble resin soluble in the range wherein the pH of the ink composition is from 3 to 7.
(6) The reversible thermal discoloration aqueous ink composition according to the above (5), wherein the water-soluble resin is polyvinyl alcohol.
(7) The reversible thermal discoloration aqueous ink composition according to the above (6), wherein the saponification degree of the polyvinyl alcohol is from 70% to 89%.
(8) The reversible thermal discoloration aqueous ink composition according to any one of the above (5) to (7), which contains the water-soluble resin in an amount of 0.3 to 3.0% by mass.
(9) The reversible thermal discoloration aqueous ink composition according to any one of the above (1) to (8), wherein the surface tension of the ink composition falls within the range of 25 to 45 mN/m.
(10) A writing implement equipped with a pen body containing the reversible thermal discoloration aqueous ink composition according to any one of the above (1) to (9) in a barrel and leading out the ink composition in the barrel.
(11) The writing implement according to the above (10), wherein a rear portion of the pen body comes into contact with an ink occlusion body composed of a fiber collective body contained in the barrel and the ink occlusion body is impregnated with the ink composition.
(12) The writing implement according to the above (10) or (11), wherein the pen body is a marking pen.
(13) The writing implement according to any one of the above (10) to (12), which is equipped with a frictional member.
(14) A writing implement set comprising the writing implement according to any one of the above (10) to (12) and a frictional body.

The invention can provide a reversible thermal discoloration aqueous ink composition which is capable of suppressing the lightening and deepening of handwriting at the time when a writing implement containing the reversible thermal discoloration aqueous ink composition in the barrel is used, and particularly, which does not lighten the color of handwriting with time in an erecting state or does not lighten the color of handwriting by the application of vibration at transportation or at the time when it is carried on in an erecting state, as well as a writing implement using the same and a writing implement set.

Figure 1:
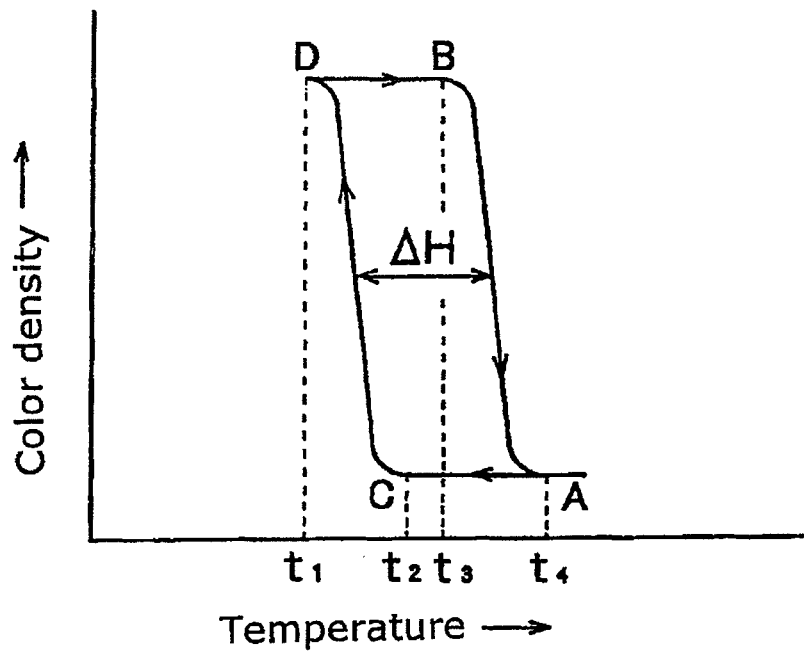
FIG. 1 is an explanatory drawing showing discoloration behavior of a heat-decoloring type reversible thermal discoloration microcapsule pigment.

DESCRIPTION OF REFERENCE NUMERALS AND SIGNS $t_1$ complete coloring temperature of a heat-decoloring type reversible thermal discoloration microcapsule pigment
$t_2$ coloring starting temperature of a heat-decoloring type reversible thermal discoloration microcapsule pigment
$t_3$ decoloring starting temperature of a heat-decoloring type reversible thermal discoloration microcapsule pigment complete decoloring temperature of a heat-decoloring type reversible thermal discoloration microcapsule pigment
$T_1$ complete decoloring temperature of a heat-coloring type reversible thermal discoloration microcapsule pigment
$T_2$ decoloring starting temperature of a heat-coloring type reversible thermal discoloration microcapsule pigment
$T_3$ coloring starting temperature of a heat-coloring type reversible thermal discoloration microcapsule pigment
$T_4$ complete coloring temperature of a heat-coloring type reversible thermal discoloration microcapsule pigment
$\Delta H$ hysteresis width
1 writing implement
2 ink occlusion body
3 pen body
4 barrel
5 holder
6 cap
7 frictional member
8 ink
9 stirring body
10 valve mechanism

BEST MODE FOR CARRYING OUT THE INVENTION

The coloring agent contained in the above reversible thermal discoloration aqueous ink composition is a reversible thermal discoloration microcapsule pigment including in a microcapsule a reversible thermal discoloration composition containing at least essential three components of (A) an electron donative coloring organic compound, (B) an electron accepting compound and (C) a reaction medium which determines a temperature at which color reactions of both compounds occur, the reversible thermal discoloration composition being decolored by heating.

As the above reversible thermal discoloration composition, it discolors with a determined temperature (discoloration point) as a border; it shows a decolored state in a temperature region equal to or higher than the discoloration point at a high temperature side and a colored state in a temperature region equal to or lower than the discoloration point at a low temperature side; only one specified state of both states as mentioned above exists in an ordinary temperature region and the other state is maintained while a heat or cold necessary for expressing the state is applied but returns to the state shown in the ordinary temperature range when application of the heat or cold is removed; it has a property that a hysteresis width is relatively small ($\Delta H$=1 to 7° C.), as described in JP-B-51-44706, JP-B-51-44707, JP-B-1-29398, and the like (see FIG. 1).

Figure 2:
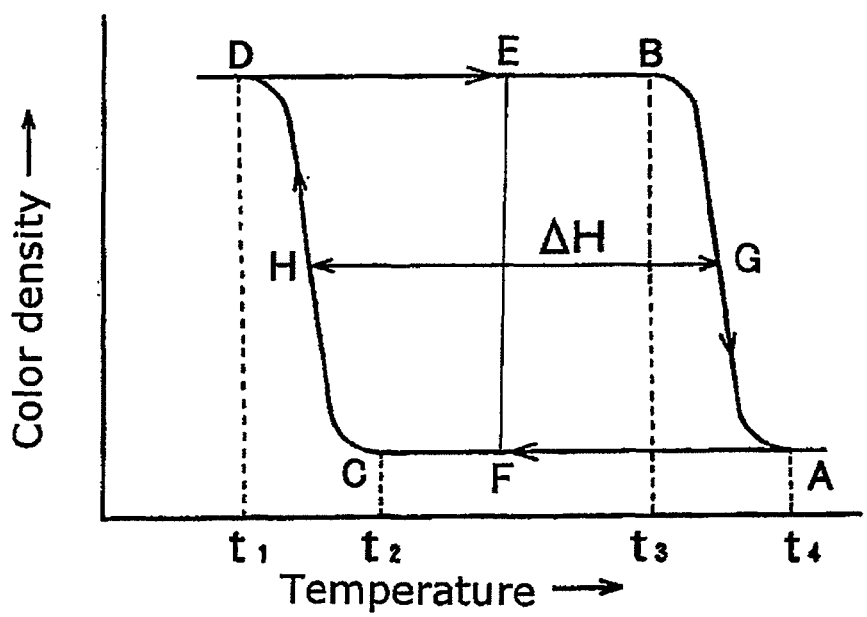
FIG. 2 is an explanatory drawing showing discoloration behavior of a heat-decoloring type reversible thermal discoloration microcapsule pigment having a color-memory property.

Moreover, there can be applied a heat-decoloring type microcapsule pigments including in a microcapsule a reversible thermal discoloration composition which shows a large hysteresis characteristic ($\Delta H_B$=8 to 50° C.), as described in JP-B-4-17154, JP-A-7-179777, JP-A-7-33997, JP-A-8-39936 and the like, namely, in the discoloration, the shape of a curve plotting a change in color density with a temperature change traces a course which is largely different between the case where the temperature is elevated from a low temperature side of the discoloration temperature region and the case where the temperature is lowered from a high temperature side from the discoloration temperature region, and which has a color-memory property that a colored state in a low temperature region equal to or lower than the complete coloring temperature ($t_1$) or a decolored state in a high temperature region equal to or higher than the complete decoloring temperature ($t_4$) is maintained in a specified temperature region [a temperature region between $t_2$ and $t_3$ (a substantial two phase retention temperature region)] (see FIG. 2).

Hysteresis characteristic in a color density-temperature curve of the above reversible thermal discoloration composition will be described in the following.

In FIG. 2, the color density is plotted on the ordinate and the temperature on the abscissa. A change in the color density due to a temperature change progresses along the arrow. On this graph, A is a point showing the density at a temperature $t_4$ at which a decolored state reaches a completely decolored state (hereinafter referred to as "complete decoloring temperature"), B is a point showing the density at a temperature $t_3$ at which decoloring starts (hereinafter referred to as "decoloring starting temperature"), C is a point showing the density at a temperature $t_2$ at which coloring starts (hereinafter referred to as "coloring starting temperature"), and D is a point showing the density at a temperature $t_1$ at which a colored state reaches a completely colored state (hereinafter referred to as "complete coloring temperature").

The discoloration temperature region is a temperature region between the aforementioned $t_1$ and $t_4$ wherein two phases of the colored state and decolored state can coexist, while the temperature region between $t_2$ and $t_3$ which has a large difference in the color density is a substantial discoloration temperature region.

The length of the line segment EF is a measure showing contrast of discoloration, and the length of the line segment HG passing through a middle point of the line segment EF is a temperature width showing the degree of hysteresis (hereinafter referred to as "hysteresis width $\Delta H$"). A small $\Delta H$ value allows the presence of only one state of the both states before and after discoloration in an ordinary temperature region. A large $\Delta H$ value facilitates retention of each state before or after discoloration.

As the above reversible thermal discoloration composition having a color-memory property, specifically, it can be effectively functioned for the retention of color shown at an ordinary state (daily life temperature region) by specifying the complete coloring temperature $t_1$ to a temperature obtained only in a freezer, a cold district, and the like, i.e., a range of −50 to 0° C., preferably −40 to −5° C., more preferably −30 to −10° C. and the complete decoloring temperature $t_4$ to a temperature obtained from frictional heat generated with a frictional body or a familiar heating body such as a hair dryer, i.e., a range of 45 to 95° C., preferably 50 to 90° C., more preferably 60 to 80° C. and specifying the ΔH value to 40 to 100° C.

The following will specifically exemplify the following respective components of (A), (B), and (C).

Examples of the electron donative coloring organic compound of the component (A) of the invention include diphenylmethanephthalides, phenylindolylphthalides, indolylphthalides, diphenylmethaneazaphthalides, phenylindolylazaphthalides, fluorans, styrylquinolines, and diazarhodamine lactones.

The following will exemplify these compounds:

There may be mentioned 3,3-bis(p-dimethylaminophenyl)-6-dimethylaminophthalide, 3-(4-diethylaminophenyl)-3-(1-ethyl-2-methylindol-3-yl)phthalide, 3,3-bis(1-n-butyl-2-methylindol-3-yl)phthalide, 3,3-bis(2-ethoxy-4-diethylaminophenyl)-4-azaphthalide, 3-(2-ethoxy-4-diethylaminophenyl)-3-(1-ethyl-2-methylindol-3-yl)-4-azaphthalide, 3-[2-ethoxy-4-(N-ethylanilino)phenyl]-3-(1-ethyl-2-methylindol-3-yl)-4-azaphthalide, 3,6-diphenylaminofluoran, 3,6-dimethoxyfluoran, 3,6-di-n-butoxyfluoran, 2-methyl-6-(N-ethyl-N-p-tolylamino)fluoran, 3-chloro-6-cyclohexylaminofluoran, 2-methyl-6-cyclohexylaminofluoran, 2-(2-chloroanilino)-6-di-n-butylaminofluoran, 2-(3-trifluoromethylanilino)-6-diethylaminofluoran, 2-(N-methylanilino)-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methyl-6-di-n-butylaminofluoran, 2-xylidino-3-methyl-6-diethylaminofluoran, 1,2-benz-6-diethylaminofluoran, 1,2-benz-6-(N-ethyl-N-isobutylamino)fluoran, 1,2-benz-6-(N-ethyl-N-isoamylamino)fluoran, 2-(3-methoxy-4-dodecoxystyryl)quinoline, spiro[5H-(1)benzopyrano(2,3-d)pyrimidine-5,1'(3'H)isobenzofuran]-3'-one, 2-(diethylamino)-8-(diethylamino)-4-methyl-spiro[5H-(1)benzopyrano(2,3-d)pyrimidine-5,1'(3'H)isobenzofuran]-3'-one, 2-(di-n-butylamino)-8-(di-n-butylamino)-4-methyl-spiro[5H-(1)benzopyrano(2,3-d)pyrimidine-5,1'(3'H)isobenzofuran]-3'-one, 2-(di-n-butylamino)-8-(diethylamino)-4-methyl-spiro[5H-(1)benzopyrano(2,3-d)pyrimidine-5,1'(3'H)isobenzofuran]-3'-one, 2-(di-n-butylamino)-8-(N-ethyl-N-1-amylamino)-4-methyl-spiro[5H-(1)benzopyrano(2,3-d)pyrimidin-5,1'(3'H)isobenzofuran]-3'-one, 3-(2-methoxy-4-dimethylaminophenyl)-3-(1-butyl-2-methylindol-3-yl)-4,5,6,7-tetrachlorophthalide, 3-(2-ethoxy-4-diethylaminophenyl)-3-(1-ethyl-2-methylindol-3-yl)-4,5,6,7-tetrachlorophthalide, and 3-(2-ethoxy-4-diethylaminophenyl)-3-(1-pentyl-2-methylindol-3-yl)-4,5,6,7-tetrachlorophthalide.

In addition, pyridine, quinazoline and bisquinazoline compounds which are effective for producing fluorescent yellow to red colors can be also used.

As the electron accepting compound of the component (B), a group of compounds having active protons, a group of pseudo-acidic compounds (a group of compounds which are not acid but cause color development of the component (A) by acting as acid in the composition) and a group of compounds having electron voids can be mentioned.

Examples of the compound having active protons include, as compounds having a phenolic hydroxyl group, monophenols and polyphenols, their derivatives having a substituent group such as an alkyl group, an aryl group, an acyl group, an alkoxycarbonyl group, a carboxy group or an ester thereof, an amido group, or a halogen group, and phenol-aldehyde condensed resins such as bisphenols and trisphenols. In addition, they may be metal salts of the above compounds having a phenolic hydroxyl group.

The following shows specific examples:

There may be mentioned phenol, o-cresol, tertiary butylcatechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 2,2-bis(4-hydroxyphenyl)propane, 4,4-dihydroxydiphenylsulfone, 1,1-bis(4-hydroxyphenyl)ethane, 2,2-bis(4-hydroxy-3-methylphenyl)propane, bis(4-hydroxyphenyl)sulfide, 1-phenyl-1,1-bis(4-hydroxyphenyl)ethane, 1,1-bis(4-hydroxyphenyl)-3-methylbutane, 1,1-bis(4-hydroxyphenyl)-2-methylpropane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane, 1,1-bis(4-hydroxyphenyl)-n-decane, 1,1-bis(4-hydroxyphenyl)-n-dodecane, 2,2-bis(4-hydroxyphenyl)butane, 2,2-bis(4-hydroxyphenyl)ethyl propionate, 2,2-bis(4-hydroxyphenyl)-4-methylpentane, 2,2-bis(4-hydroxyphenyl)hexafluoropropane, 2,2-bis(4-hydroxyphenyl)-n-heptane and 2,2-bis(4-hydroxyphenyl)-n-nonane.

Though the above compound having a phenolic hydroxyl group can express most effective thermal discoloration characteristics, the component (B) may be a compound selected from aromatic carboxylic acids and aliphatic carboxylic acids having from 2 to 5 carbon atoms, carboxylic acid metal salts, acidic phosphoric acid esters and metal salts thereof, and 1,2,3-triazole and derivatives thereof.

The following will explain the component (C) which is a reaction medium which reversibly induces an electron donating and accepting reaction between the above components (A) and (B). Examples of the component (C) include esters, ketones, ethers, alcohols, and acid amides.

As the component (C), there may be used a carboxylic acid ester compound which discolors with showing a large hysteresis characteristic with regard to a color density-temperature curve (a curve plotting a change in color density with a temperature change is different between the case where the temperature is changed from a low temperature side to a high temperature side and the case where the temperature is changed from a high temperature side to a low temperature side), is capable of forming a reversible thermal discoloration composition having a color-memory property, and shows a ΔT value (melting point-cloud point) ranging from 5° C. to less than 50° C., for example, a carboxylic acid ester containing a substituted aromatic ring in the molecule, an ester of a carboxylic acid containing an unsubstituted aromatic ring with an aliphatic alcohol having 10 or more carbon atoms, a carboxylic acid ester containing a cyclohexyl group in the molecule, an ester of a fatty acid having 6 or more carbon atoms with an unsubstituted aromatic alcohol or phenol, an ester of a fatty acid having 8 or more carbon atoms with a branched aliphatic alcohol, an ester of a dicarboxylic acid with an aromatic alcohol or a branched aliphatic alcohol, dibenzyl cinnamate, heptyl stearate, didecyl adipate, dilauryl adipate, dimyristyl adipate, dicetyl adipate, distearyl adipate, trilaurin, trimyristin, tristearin, dimyristin, or distearin.

In addition, a fatty acid ester compound obtained from an odd-numbered aliphatic monohydric alcohol having 9 or more carbon atoms and an even-numbered aliphatic carboxylic acid and a fatty acid ester compound having from 17 to 23 carbon atoms in total obtained from n-pentyl alcohol or n-heptyl alcohol and an even-numbered aliphatic carboxylic acid having from 10 to 16 carbon atoms are also effective.

Specifically, there may be mentioned n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, and n-pentadecyl behenate.

As the ketones, aliphatic ketones having 10 or more carbon atoms in total are effective and there may be mentioned 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone.

Also, there may be mentioned aryl alkyl ketones having from 12 to 24 carbon atoms in total, for examples, n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone.

As the ethers, aliphatic ethers having 10 or more carbon atoms in total are effective and there may be mentioned dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether.

As the alcohols, aliphatic monohydric saturated alcohols having 10 or more carbon atoms in total are effective and there may be mentioned decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, and docosyl alcohol.

As the acid amides, there may be mentioned hexanamide, heptanamide, octanamide, nonanamide, decanamide, undecanamide, lauryl amide, tridecanamide, myristamide, palmitamide, stearamide, and docosanamide.

In addition, as the above component (C), a compound represented by the following formula (1) described in JP-A-2006-137886 is suitably used:

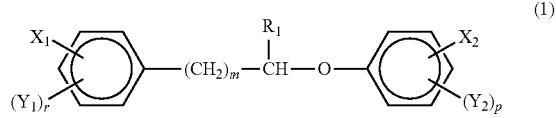
(1)

wherein $R_1$ represents a hydrogen atom or a methyl group, m represents an integer of 0 to 2, either one of $X_1$ and $X_2$ represents —$(CH_2)_nOCOR_2$ or —$(CH_2)_nCOOR_2$ and the other represents a hydrogen atom, n represents an integer of 0 to 2, $R_2$ represents an alkyl or alkenyl group, having from 4 or more carbon atoms, $Y_1$ and $Y_2$ each represents a hydrogen atom, an alkyl group having from 1 to 4 carbon atoms, a methoxy group, or a halogen, and r and p each represents an integer of 1 to 3.

Among the compounds represented by the above formula (1), the case where $R_1$ is a hydrogen atom is preferred since the reversible thermal discoloration composition having a wider hysteresis width is obtained. Furthermore, the case where $R_1$ is a hydrogen atom and m is 0 is more preferred.

In this connection, among the compounds represented by the formula (1), a compound represented by the following formula (2) is more preferably used:

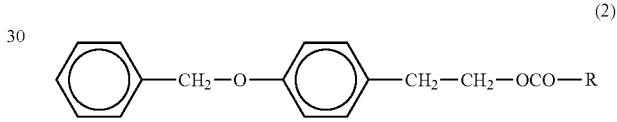
(2)

wherein R represents an alkyl or alkenyl group, having 8 or more carbon atoms, and preferred is an alkyl group having from 10 to 24 carbon atoms and more preferred is an alkyl group having from 12 to 22 carbon atoms.

Specific examples of the above compounds may include 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate, and 4-benzyloxyphenylethyl octadecanoate.

Furthermore, as the above component (C), a compound represented by the following formula (3) described in JP-A-2006-188660 can be also used:

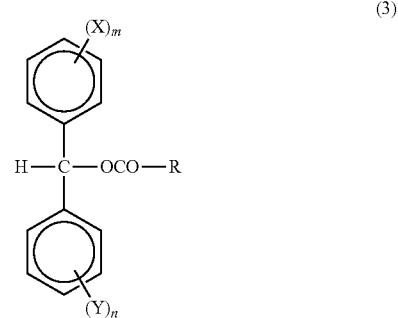
(3)

wherein R represents an alkyl or alkenyl group, having 8 or more carbon atoms, m and n each represents an integer of 1 to 3, X and Y each represents a hydrogen atom, an alkyl group having from 1 to 4 carbon atom, an alkoxy group having from 1 to 4 carbon atom, and a halogen atom.

Specific examples of the above compound include 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, and 1,1-diphenylmethyl octadecanoate.

In addition, as the above component (C), a compound represented by the following formula (4) can be also used:

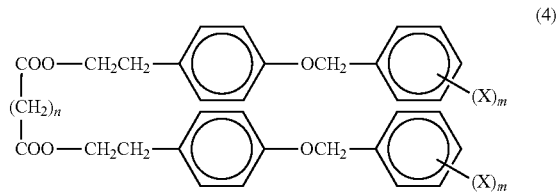

wherein X represents any of a hydrogen atom, an alkyl group having 1 to 4 carbon atoms, a methoxy group, and a halogen atom, m represents an integer of 1 to 3, and n represents an integer of 1 to 20.

Examples of the above compound may include diester of malonic acid with 2-[4-(4-chlorobenzyloxy)phenyl]ethanol, diester of succinic acid with 2-(4-benzyloxyphenyl)ethanol, diester of succinic acid with 2-[4-(3-methylbenzyloxy)phenyl]ethanol, diester of glutaric acid with 2-(4-benzyloxyphenyl)ethanol, diester of glutaric acid with 2-[4-(4-chlorobenzyloxy)phenyl]ethanol, diester of adipic acid with 2-(4-benzyloxyphenyl)ethanol, diester of pimelic acid with 2-(4-benzyloxyphenyl)ethanol, diester of suberic acid with 2-(4-benzyloxyphenyl)ethanol, diester of suberic acid with 2-[4-(3-methylbenzyloxy)phenyl]ethanol, diester of suberic acid with 2-[4-(4-chlorobenzyloxy)phenyl]ethanol, diester of suberic acid with 2-[4-(2,4-dichlorobenzyloxy)phenyl]ethanol, diester of azelaic acid with 2-(4-benzyloxyphenyl)ethanol, diester of sebacic acid with 2-(4-benzyloxyphenyl)ethanol, diester of 1,10-decanedicarboxylic acid with 2-(4-benzyloxyphenyl)ethanol, diester of 1,18-octadecanedicarboxylic acid with 2-(4-benzyloxyphenyl)ethanol, and diester of 1,18-octadecanedicarboxylic acid with 2-[4-(2-methylbenzyloxy)phenyl]ethanol.

Figure 3:
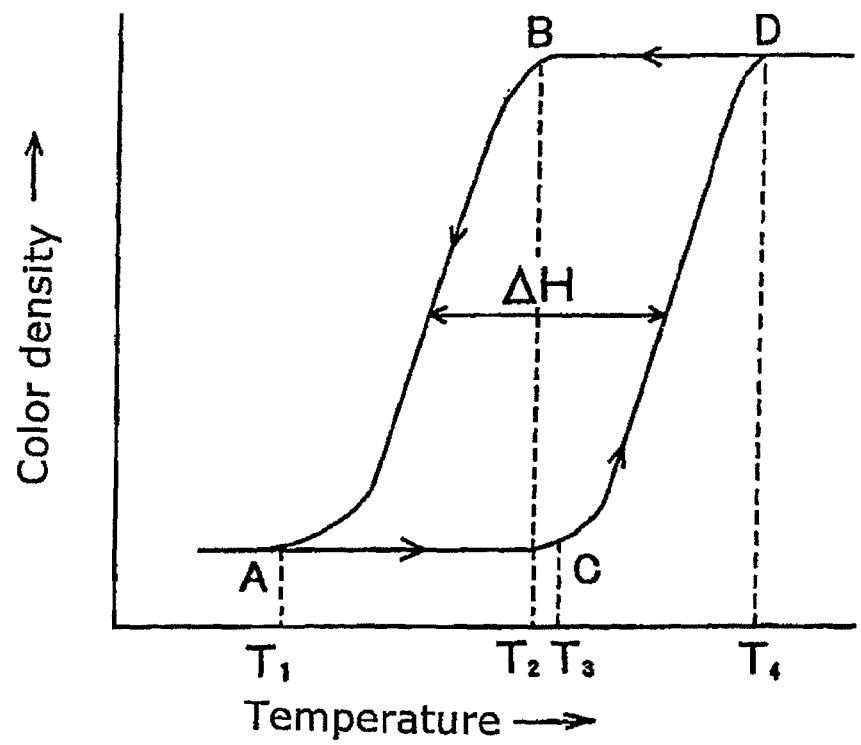
FIG. 3 is an explanatory drawing showing discoloration behavior of a heat-coloring type reversible thermal discoloration microcapsule pigment.

Furthermore, there can be applied a heat-coloring type microcapsule pigment including a reversible thermal discoloration composition using a specific alkoxyphenol compound having a linear or branched alkyl group having from 3 to 18 carbon atoms (JP-A-11-129623), a specific hydroxybenzoic acid ester (JP-A-2001-105732), a gallic acid ester (JP-A-2003-253149), or the like as the electron accepting compound (see FIG. 3).

Though the ratio of the above components (A), (B) and (C) to be mixed depends on the concentration, discoloration temperature, discoloration mode and kind of each component, the component ratio at which desired discoloration characteristics can be generally obtained is in the range of 0.1 to 50, preferably 0.5 to 20 of the component (B), and in the range of 1 to 800, preferably from 5 to 200 of the component (C), based on 1 of the component (A) (each of the aforementioned ratios is expressed as part(s) by mass).

In this regard, it is also possible to cause interchangeable color change from a color (1) to a color (2) by incorporating a coloring agent such as a non-thermochromic dyestuff or pigment into the above reversible thermal discoloration microcapsule pigment or ink.

Examples of the microencapsulation method of the above reversible thermal discoloration composition include interfacial polymerization, interfacial polycondensation, in situ polymerization, submerged coat hardening, phase separation from an aqueous solution, phase separation from an organic solvent, melt dispersion cooling, aerial suspension coating and spray drying. It can be selected as needed, depending on the using purpose. In addition, the microcapsules can be subjected to practical use by further giving durability and modifying surface characteristics in response to the object through the arrangement of a secondary resin coating on the surface.

With regard to the form of the above microcapsule pigment, the application of a form having a round cross-section is not refused but a form having a non-round cross-section is effective.

The handwriting formed by writing is densely arranged and fixed to a surface to be written with close contact of the above microcapsule pigment at the long diameter side (maximum outer diameter side) to show a high-density coloring characteristic. Also, against an external force applied to the above handwriting by rubbing with a frictional body such as rubber, the above microcapsule pigment subtly undergoes elastic deformation into a shape relaxing the external force, the destroy of the wall membrane of the microcapsule was suppressed, and the thermal discoloration function thereof can be effectively expressed without impairing the function.

It is preferred that the above microcapsule pigment having a non-round cross-section has an average value of the maximum outer diameter within the range of 0.5 to 5.0 µm, preferably 1 to 4 µm, more preferably 1 to 3 µm and satisfies the requirement that the ratio of the reversible thermal discoloration composition:wall membrane falls within the range of 7:1 to 1:1 (ratio by mass), preferably 6:1 to 1:1.

When the average value of the maximum outer diameter exceeds 5.0 µm, decrease in effluence from capillary interstices tends to occur, while when the average value of the maximum outer diameter is less than 0.5 µm, a high-density coloring characteristic is hardly obtained.

When the ratio of the reversible thermal discoloration composition to the wall membrane is larger than the above range, the wall membrane becomes too thin and hence decrease in durability against pressure and heat is apt to occur, while when the ratio of the wall membrane to the reversible thermal discoloration composition is larger than the above range, decrease in color density and sharpness tends to occur.

The above reversible thermal discoloration microcapsule pigment may be incorporated to the total amount of the ink composition in an amount of 5 to 40% by mass, preferably 10 to 40% by mass, further preferably 10 to 30% by mass.

When the amount is less than 5% by mass, the color density is insufficient, while when it exceeds 40% by mass, ink effluence decreases and hence writing performance is inhibited.

As the medium to be used in the above ink, water and, if necessary, a water-soluble organic solvent are used.

As the above water-soluble organic solvent, for example, ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, N-methyl-2-pyrrolidone, or the like may be used.

In this connection, since the specific gravity of the microcapsule pigment including a reversible thermal discoloration composition having a large hysteresis width generally exceeds 1, the water-soluble organic solvent having a specific gravity of more than 1.1 is preferably employed.

By adding a water-soluble polymer flocculant into the above ink, the flocculant induces a loose crosslinking action between particles of the microcapsule pigment, thereby a loose flocculated state being shown. An ink showing such a loose flocculated state can suppress the separation of the microcapsule pigment.

As the above polymer flocculant, a water-soluble polymer is used and examples thereof include polyvinylpyrrolidone, polyethylene oxide, and water-soluble polysaccharides.

The above water-soluble polysaccharides include tragacanth gum, guar gum, pullulan, cyclodextrin, and water-soluble cellulose derivatives. Specific examples of the water-soluble cellulose derivatives include methylcellulose, hydroxyethylcellulose, hydroxypropylcellulose, hydroxyethylmethylcellulose, and hydroxypropylmethylcellulose.

In the reversible thermal discoloration aqueous ink composition of the invention, all the water-soluble polymers can be employed so far as they show the loose crosslinking action between the particles of the microcapsule pigment but, in particular, a water-soluble cellulose derivative effectively functions.

In this connection, two or more kinds of the above polymer flocculants can be used in combination.

By combined use of a comb-type polymer dispersant having a carboxyl group in the side chain and an organic nitrogen sulfur compound together with the above polymer flocculant, the dispersibility of a loose flocculate of the microcapsule pigment induced by the above polymer flocculant is improved.

The comb-type polymer dispersant having a carboxyl group in the side chain is not particularly limited so far as it is a comb-type polymer compound having a plurality of carboxyl groups in the side chain but an acrylic polymer compound having a plurality of carboxyl groups in the side chain is preferred. As the compound, trade name: Solsparse 43000 manufactured by Lubrizol Japan Ltd. can be mentioned as an example.

The above organic nitrogen sulfur compound further suppresses the precipitation of the microcapsule pigment induced by vibration at the time when the ink composition is filled into a writing implement for practical use.

This is because the compound further improves the dispersibility of dispersing the loose flocculate of the microcapsule pigment by the action of the comb-type polymer dispersant having a carboxyl group in the side chain.

As the organic nitrogen sulfur compound, a compound selected from thiazole compounds, isothiazole compounds, benzothiazole compounds, and benzisothiazole compounds may be used.

As the organic nitrogen sulfur compound, specifically, one or two or more compounds selected from 2-(4-thiazoyl)-benzimidazole (TBZ), 2-(thiocyanatomethylthio)-1,3-benzothiazole (TCMTB), 2-methyl-4-isothiazolin-3-one, and 5-chloro-2-methyl-4-isothiazolin-3-one may be used and preferably, one or two or more compounds selected from 2-(4-thiazoyl)-benzimidazole (TBZ), 2-methyl-4-isothiazolin-3-one, and 5-chloro-2-methyl-4-isothiazolin-3-one may be used.

Examples of the above organic nitrogen sulfur compound may include trade names: Topside 88, 133, 170, 220, 228, 300, 400, 500, 600, 700Z, 800, and 950 manufactured by Parmachem Asia; and trade names: Hokustar HP and E50A, Hokuside P200, 6500, 7400, MC, 369, and R-150 manufactured by Hokko Sangyo Co., Ltd.

In this connection, the mass ratio of the above comb-type polymer dispersant having a carboxyl group in the side chain to the organic nitrogen sulfur compound is from 1:1 to 1:10, preferably from 1:1 to 1:5. When the ratio falls within the above range, the dispersibility of the loose flocculant of the microcapsule pigment and the suppression of precipitation of the microcapsule pigment induced by vibration can be sufficiently exhibited.

The above water-soluble resin is added for imparting adhesiveness and viscosity to a paper surface and also has a function of enhancing the stability of the above comb-type polymer dispersant having a carboxyl group in the side chain and the organic nitrogen sulfur compound in the ink.

Examples of the water-soluble resin include alkyd resins, acrylic resins, styrene-maleic acid copolymers, cellulose derivatives, polyvinylpyrrolidone, polyvinyl alcohol, and dextrin, and preferably, polyvinyl alcohol is used.

Furthermore, as the polyvinyl alcohol, a partially saponified polyvinyl alcohol having a saponification degree of 70 to 89% by mol is more preferably used since it is rich in solubility even when the ink is in an acidic region.

As for the amount of the above water-soluble resin, it is added into the ink in an amount ranging from 0.3 to 3.0% by mass, preferably 0.5 to 1.5% by mass.

By controlling the pH of the above ink composition to 3 to 7, preferably 4 to 6, more preferably 5 to 6, the flocculation and precipitation of the contained reversible thermal discoloration microcapsule pigment in a low temperature region can be suppressed.

When the pH exceeds 7, the ink effluence tends to be impaired at the time when the ink is allowed to stand in a low temperature region, i.e., a temperature region where the ink is frozen. Also, when the pH is less than 3, the coloring characteristic of the reversible thermal discoloration aqueous ink composition included in the capsule is strengthened and hence there may arise a problem that a color remains at decoloring.

The above ink composition is controlled in its surface tension within the range of 25 to 45 mN/m, preferably 30 to 45 mN/m, more preferably 30 to 40 mN/m.

By controlling the surface tension within the above range, patchy touching at writing hardly occurs, the ink effluence is not impaired even when the composition is allowed to stand in a temperature region lower than 0° C. where the ink is frozen or allowed to stand at a high temperature region, e.g., under an environment of 50° C., and unevenness in handwriting density and writing width depending on the storage environment and use environment hardly occurs.

When the surface tension is less than 25 mN/m, the ink effluence tends to be unstable and the handwriting density becomes uneven. Also, when the surface tension exceeds 45 mN/m, line breaking tends to occur and also the ink effluence decreases under the storage environment and use environment described above, thereby decrease in handwriting density and unevenness in writing width being apt to occur.

In addition, if necessary, there may be used antirusts such as benzotriazole, tolyltriazole, dicyclohexylammonium nitrite, diisopropylammonium nitrite, and saponin; wetting agents such as urea, nonionic surfactants, reduced or unreduced starch hydrolyzates, disaccharides including trehalose, oligosaccharides, sucrose, cyclodextrins, glucose, dextrins, sorbitol, mannitol, and sodium pyrophosphate; defoaming agents; fluorine-based surfactants and nonionic surfactants which improve permeability of the ink.

As the pen body, a marking pen is suitable and a pen body such as a fiber tip, a felt tip, and a plastic tip may be mentioned.

Moreover, a brush pen body or a ball-point pen body may be used. Examples of the brush pen body include a fiber collective body in which fibers are closely bundled each other in a longitudinal direction, a plastic porous body having continuous voids, a thermally fused or resin processed body of a synthetic resin fiber, and an extrusion processed body of a soft resin or an elastomer.

Examples of the ball-point pen include a pen in which a metal is cut to form a ball-receiving seat and an ink-effluent part, and a pen in which a plurality of inward protruded parts are provided at the inner surface near to one end of a metal pipe by external press deformation and ink-effluent gaps radially extending outward from the central part in a radial direction are formed between the individual above inward protruded parts.

The ball held in the above ball-point pen is effectively a ball of a cemented carbide, a stainless steel, ruby, a ceramic, or the like, having an outer diameter of 0.3 to 2.0 mm, preferably 0.4 to 1.5 mm, more preferably 0.5 to 1.0 mm.

In this connection, the above ball-point pen may have a constitution wherein a snapping member which snaps the rear part of the ball forward is provided so that the ball is pressed to the inner rim of front end of the pen body to be in a closely contacted state at non-writing and the ball is retracted by writing pressure to enable the effluence of the ink at writing.

For the above barrel, a molded body composed of a thermoplastic resin such as polyethylene, polypropylene, polyethylene terephthalate, or Nylon is suitably employed.

Moreover, as the structure of the writing implement containing the above ink composition, there may be mentioned a direct liquid type writing implement having a structure where a valve mechanism is provided in the barrel and the ink in the barrel is delivered to the pen body due to opening of the valve or a direct liquid type writing implement having a structure where the ink is directly contained inside the barrel and an ink flow-controlling member having comb-shape grooves or an ink flow-controlling member composed of a fiber bundle intervenes is contained therein. However, suitable is an inner-wadding type writing implement having a structure where an ink occlusion body composed of a fiber bundle to be contained in the barrel is impregnated with the ink, a pen body is mounted on the writing front part, and the rear part of the pen body comes into contact with the ink occlusion body directly or via a connecting member.

The above ink occlusion body is formed by bundling crimped fibers in a longitudinal direction and is constituted by placing the resulting fiber bundle in a cover body such as a plastic tube or a film and controlling the porosity to the range of about 40 to 90%. In this connection, the above fiber bundle body may be adhesion-processed by resin processing or heat-fusion processing, a plasticizer, or the like.

The handwriting formed with a writing implement containing the above ink composition can be discolored by rubbing with a finger or application of a heating implement or a cooling implement.

Examples of the above heating tool include a conducting thermal discoloration implement equipped with a resistor heating body, a heating discoloration implement filled with hot water or the like, and application of hair drier. Preferably, a frictional member or a frictional body capable of discoloration by a conventional method may be used.

The above frictional member or frictional body is suitably an elastic body such as an elastomer or a plastic foam rich in elastic feeling and capable of generating appropriate friction at rubbing to produce frictional heat but may be a plastic molded body, a stone, a wood, a metal, or a fabric.

In this connection, the handwriting can be rubbed by means of a gum eraser but, since bits of the eraser are generated at rubbing, the frictional member as mentioned above is preferably used.

As materials for the above frictional member or frictional body, a silicone resin or an SEBS resin (styrene-ethylene-butadiene-styrene block copolymer) is suitably used but the SEBS resin is more suitably used since the silicone resin tends to adhere to the portion erased with rubbing and the handwriting tends to be repelled at repeated writing.

The above frictional member may be a member (frictional body) having any shape separated from the writing implement but its fixation to the writing implement results in excellent portability.

The portion to which the above frictional member is fixed may be a cap front part (apex part) or a barrel rear part (portion on which a writing tip is not mounted).

Furthermore, it is also possible to provide a small protruded portion having any shape at a part of the cap or a part of the barrel to be a frictional member.

Examples of the cooling implement include a cooling discoloration implement utilizing a Peltier element, a cooling discoloration implement filled with a coolant such as cold water or ice chips, and application of a refrigerator or freezer.

In addition, a writing implement set can also be obtained by combining the above writing implement and a frictional body.

EXAMPLES

The following will illustrate the reversible thermal discoloration aqueous ink compositions for writing implements of the invention and writing implements using the same but the invention is not limited thereto.

In this connection, the term "part(s)" in Examples means part(s) by weight.

The surface tension of the ink was measured by automatic surface tensiometer (CBVP-A3) manufactured by Kyowa Interface Science Co., Ltd.

Example 1

Preparation of Reversible Thermal Discoloration Microcapsule Pigment

A microcapsule pigment suspension which included a reversible thermal discoloration composition having a color-memory property and composed of 3.0 parts of 1,3-dimethyl-6-diethylaminofluorane as the component (A), 3.0 parts of 4,4'-(2-ethylhexan-1,1-diyl)diphenol, 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversible thermal discoloration microcapsule pigment.

The average particle diameter of the above microcapsule pigment was 2.5 μm, the complete decoloring temperature was 60° C., and the complete coloring temperature was −20° C. The pigment changed color from orange to colorless through a change in temperature.

Preparation of Reversible Thermal Discoloration Aqueous Ink Composition

A reversible thermal discoloration aqueous ink composition was obtained by mixing 20.0 parts of the resulting microcapsule pigment (colored orange by cooling to −20° C. or lower beforehand), 0.5 part of hydroxyethylcellulose, 0.2 part of a comb-type polymer dispersant [trade name: Solsparse 43000 manufactured by Lubrizol Japan Ltd.], 1.0 part of an organic nitrogen sulfur compound [trade name: Hokuside R-150 manufactured by Hokko Chemical Industry Co., Ltd., a mixture of 2-methyl-4-isothiazolin-3-one and 5-chloro-2-methyl-4-isothiazolin-3-one], 0.5 part of polyvinyl alcohol, 25.0 parts of glycerin, 0.02 part of a defoaming agent, and 52.78 parts of water.

The pH of the above ink composition was 6.98 and the surface tension was 41.0 mN/m.

Figure 4:
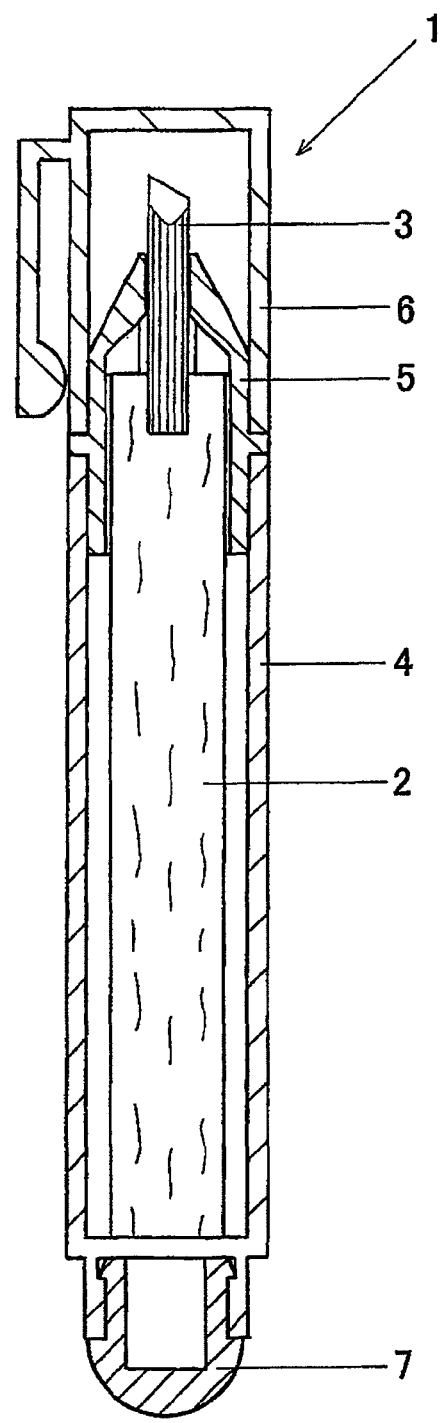
FIG. 4 is an explanatory drawing showing one example of the writing implement of the invention.

Preparation of Inner-Wadding Type Writing Implement (See FIG. 4)

An ink occlusion body 2 prepared by coating a polyester sliver with a synthetic resin film was impregnated with the above ink composition. The resulting body was housed in a barrel 4 made of a polypropylene resin and assembled, via a holder 5, in such a manner that the body is connected with a resin processed pen body 3 (artillery shell shape) of polyester fiber mounted on the front part of the barrel. A cap 6 was then fitted thereto, whereby an inner-wadding type writing implement 1 (marking pen) was obtained.

An SEBS resin was fitted to the rear part of the above barrel as a frictional member 7.

Using the resulting writing implement, an orange letter (handwriting) was formed by writing on a sheet of paper.

The above-described handwriting was orange at room temperature (25° C.), but the letter discolored and became colorless when rubbed using the frictional member fitted to the barrel. This state was kept under room temperature. When the sheet of paper was cooled to −20° C. or less, the color was returned to original orange and the discoloration behavior was reproduced repeatedly.

Example 2

Preparation of Reversible Thermal Discoloration Microcapsule Pigment

A microcapsule pigment suspension which included a reversible thermal discoloration composition having a color-memory property and composed of 1.0 part of 2-(dibutylamino)-8-(dipentylamino)-4-methyl-spiro[5H-[1]benzopyrano[2,3-g]pyrimidine-5,1'(3'H)-isobenzofuran]-3-one as the component (A), 3.0 parts of 4,4'-(2-ethylhexan-1,1-diyl)diphenol, 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversible thermal discoloration microcapsule pigment.

The average particle diameter of the above microcapsule pigment was 2.3 μm, the complete decoloring temperature was 58° C., and the complete coloring temperature was −20° C. The pigment changed color from pink to colorless through a change in temperature.

Preparation of Reversible Thermal Discoloration Aqueous Ink Composition

A reversible thermal discoloration aqueous ink composition was obtained by mixing 20.0 parts of the resulting microcapsule pigment (colored pink by cooling to −20° C. or lower beforehand), 0.5 part of hydroxyethylcellulose, 0.2 part of a comb-type polymer dispersant [trade name: Solsparse 43000 manufactured by Lubrizol Japan Ltd.], 1.0 part of an organic nitrogen sulfur compound [trade name: Hokuside 369 manufactured by Hokko Chemical Industry Co., Ltd.], 0.5 part of polyvinyl alcohol, 25.0 parts of glycerin, 0.02 part of a defoaming agent, and 52.78 parts of water.

The pH of the above ink composition was 6.70 and the surface tension was 40.5 mN/m.

Preparation of Inner-Wadding Type Writing Implement

An ink occlusion body prepared by coating a polyester sliver with a synthetic resin film was impregnated with the above ink composition. The resulting body was housed in a barrel made of a polypropylene resin and assembled in such a manner that the body is connected with a resin processed pen body (chisel shape) of polyester fiber mounted on the front part of the barrel. A cap was then fitted thereto, whereby an inner-wadding type writing implement (marking pen) was obtained.

An SEBS resin was fitted to the rear part of the above barrel as a frictional member.

Using the resulting marking pen, a pink highlight (handwriting) was formed by writing on a letter printed on a sheet of paper.

The above-described handwriting was pink at room temperature (25° C.), but the handwriting discolored and became colorless when rubbed using the frictional body fitted to the barrel. This state was kept under room temperature. When the sheet of paper was cooled to −20° C. or less, the color was returned to original pink and the discoloration behavior was reproduced repeatedly.

Example 3

Preparation of Reversible Thermal Discoloration Microcapsule Pigment

A microcapsule pigment suspension which included a reversible thermal discoloration composition having a color-memory property and composed of 4.5 parts of 2-(2-chloroamino)-6-dibutylaminofluorane as the component (A), 3.0 parts of 4,4'-(2-ethylhexan-1,1-diyl)diphenol, 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversible thermal discoloration microcapsule pigment.

The average particle diameter of the above microcapsule pigment was 2.4 μm, the complete decoloring temperature was 56° C., and the complete coloring temperature was −20° C. The pigment changed color from black to colorless through a change in temperature.

Preparation of Reversible Thermal Discoloration Aqueous Ink Composition

A reversible thermal discoloration aqueous ink composition was obtained by mixing 25.0 parts of the resulting microcapsule pigment (colored black by cooling to −20° C. or lower beforehand), 0.5 part of hydroxyethylcellulose, 0.2 part of a comb-type polymer dispersant [trade name: Solsparse 43000 manufactured by Lubrizol Japan Ltd.], 1.0 part of an organic nitrogen sulfur compound [trade name: Hokustar HP manufactured by Hokko Chemical Industry Co., Ltd., 2-(4-thiazoyl)-benzimidazole], 0.5 part of polyvinyl alcohol, 25.0 parts of glycerin, 0.02 part of a defoaming agent, and 47.78 parts of water.

The pH of the above ink composition was 7.0 and the surface tension was 40.0 mN/m.

Figure 5:
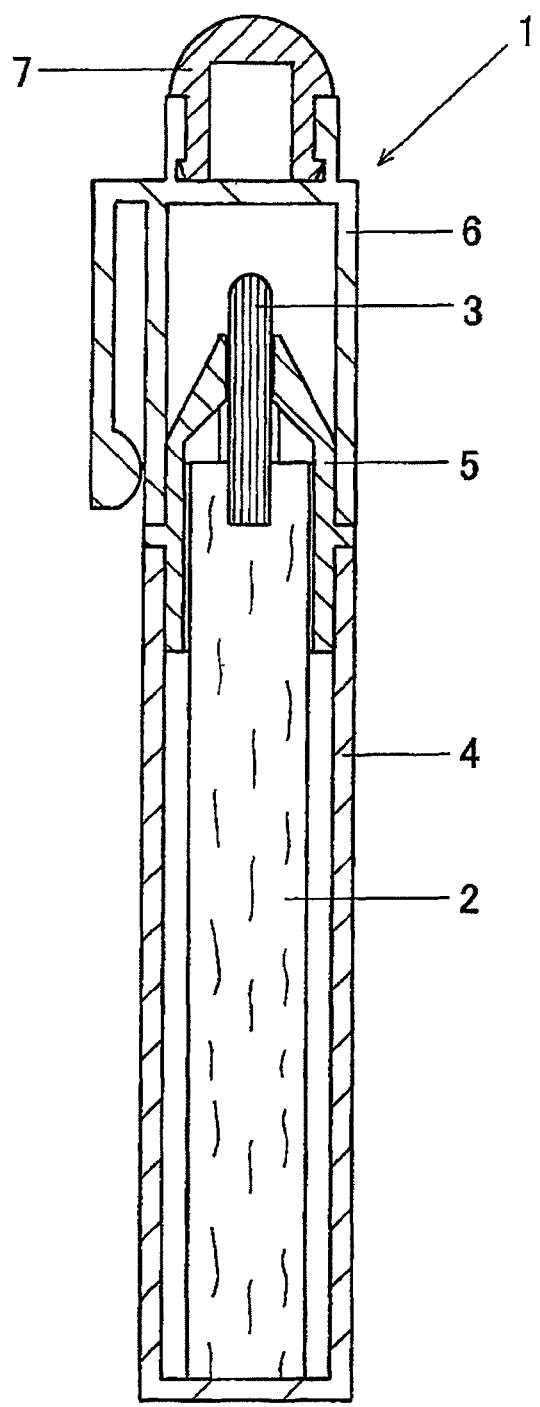
FIG. 5 is an explanatory drawing showing another example of the writing implement of the invention.

Preparation of Inner-Wadding Type Writing Implement (See FIG. 5)

An ink occlusion body 2 prepared by coating a polyester sliver with a synthetic resin film was impregnated with the above ink composition. The resulting body was housed in a barrel 4 made of a polypropylene resin and assembled, via a holder 5, in such a manner that the body is connected with a resin processed pen body 3 (artillery shell shape) of polyester fiber mounted on the front part of the barrel. A cap 6 was then fitted thereto, whereby an inner-wadding type writing implement 1 (marking pen) was obtained.

An SEBS resin was fitted to the cap at the apex thereof as a frictional member 7.

Using the resulting marking pen, a black letter (handwriting) was formed by writing on a sheet of paper.

The above-described handwriting was black at room temperature (25° C.), but the handwriting discolored and became colorless when rubbed using the frictional body fitted to the cap. This state was kept under room temperature. When the sheet of paper was cooled to −20° C. or less, the color was returned to original black and the discoloration behavior was reproduced repeatedly.

Example 4

Preparation of Reversible Thermal Discoloration Microcapsule Pigment

A microcapsule pigment suspension which included a reversible thermal discoloration composition having a color-memory property and composed of 3.0 parts of 4-[2,6-bis(2-ethoxyphenyl)-4-pyridyl]-N,N-dimethylbenzeneamine as the component (A), 10.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversible thermal discoloration microcapsule pigment.

The average particle diameter of the above microcapsule pigment was 2.5 μm, the complete decoloring temperature was 59° C., and the complete coloring temperature was −20° C. The pigment changed color from yellow to colorless through a change in temperature.

Preparation of Reversible Thermal Discoloration Aqueous Ink Composition

A reversible thermal discoloration aqueous ink composition was obtained by mixing 25.0 parts of the resulting microcapsule pigment (colored yellow by cooling to −20° C. or lower beforehand), 0.5 part of hydroxyethylcellulose, 0.2 part of a comb-type polymer dispersant [trade name: Solsparse 43000 manufactured by Lubrizol Japan Ltd.], 1.0 part of an organic nitrogen sulfur compound [trade name: Hokuside R-150 manufactured by Hokko Chemical Industry Co., Ltd., a mixture of 2-methyl-4-isothiazolin-3-one and 5-chloro-2-methyl-4-isothiazolin-3-one], 0.5 part of polyvinyl alcohol, 25.0 parts of glycerin, 0.02 part of a defoaming agent, and 47.78 parts of water.

The pH of the above ink composition was 6.60 and the surface tension was 40.5 mN/m.

Preparation of Inner-Wadding Type Writing Implement

An ink occlusion body prepared by coating a polyester sliver with a synthetic resin film was impregnated with the above ink composition. The resulting body was housed in a barrel made of a polypropylene resin and assembled in such a manner that the body is connected with a resin processed pen body (chisel shape) of polyester fiber mounted on the front part of the barrel. A cap was then fitted thereto, whereby an inner-wadding type writing implement (marking pen) was obtained.

An SEBS resin was fitted to the rear part of the above barrel as a frictional member.

Using the resulting marking pen, a yellow highlight (handwriting) was formed by writing on a letter printed on a sheet of paper.

The above-described handwriting was yellow at room temperature (25° C.), but the handwriting discolored and became colorless when rubbed using the frictional body fitted to the barrel. This state was kept under room temperature. When the sheet of paper was cooled to −20° C. or less, the color was returned to original yellow and the discoloration behavior was reproduced repeatedly.

Example 5

Preparation of Reversible Thermal Discoloration Microcapsule Pigment

A microcapsule pigment suspension which included a reversible thermal discoloration composition having a color-memory property and composed of 2.0 parts of 4,5,6,7-tetrachloro-3-[4-(dimethylamino)-2-methylphenyl]-3-(1-ethyl-2-methyl-1H-indol-3-yl)-1(3H)-isobenzofuranone as the component (A), 3.0 parts of 4,4'-(2-ethylhexan-1,1-diyl) diphenol, 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversible thermal discoloration microcapsule pigment.

The average particle diameter of the above microcapsule pigment was 2.5 μm, the complete decoloring temperature was 55° C., and the complete coloring temperature was −20° C. The pigment changed color from blue to colorless through a change in temperature.

Preparation of Reversible Thermal Discoloration Aqueous Ink Composition

A reversible thermal discoloration aqueous ink composition was obtained by mixing 20.0 parts of the resulting microcapsule pigment (colored blue by cooling to −20° C. or lower beforehand), 0.5 part of hydroxyethylcellulose, 0.2 part of a comb-type polymer dispersant [trade name: Solsparse 43000 manufactured by Lubrizol Japan Ltd.], 1.0 part of an organic nitrogen sulfur compound [trade name: Hokuside R-150 manufactured by Hokko Chemical Industry Co., Ltd., a mixture of 2-methyl-4-isothiazolin-3-one and 5-chloro-2-methyl-4-isothiazolin-3-one], 0.5 part of polyvinyl alcohol, 25.0 parts of glycerin, 0.02 part of a defoaming agent, and 52.78 parts of water.

The pH of the above ink composition was 6.9 and the surface tension was 41.0 mN/m.

Preparation of Inner-Wadding Type Writing Implement

An ink occlusion body prepared by coating a polyester sliver with a synthetic resin film was impregnated with the above ink composition. The resulting body was housed in a barrel made of a polypropylene resin and assembled in such a manner that the body is connected with a resin processed pen body (artillery shell shape) of polyester fiber mounted on the front part of the barrel. A cap was then fitted thereto, whereby an inner-wadding type writing implement (marking pen) was obtained.

An SEBS resin was fitted to the rear part of the above barrel as a frictional member.

Using the resulting writing implement, a blue letter (handwriting) was formed by writing on a sheet of paper.

The above-described handwriting was blue at room temperature (25° C.), but the letter discolored and became colorless when rubbed using the frictional member fitted to the barrel. This state was kept under room temperature. When the sheet of paper was cooled to −20° C. or less, the color was returned to original blue and the discoloration behavior was reproduced repeatedly.

Example 6

Preparation of Reversible Thermal Discoloration Microcapsule Pigment

A microcapsule pigment suspension which included a reversible thermal discoloration composition having a color-memory property and composed of 3.0 parts of 4-[2,6-bis(2-ethoxyphenyl)-4-pyridyl]-N,N-dimethylbenzeneamine as the component (A), 10.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversible thermal discoloration microcapsule pigment.

The average particle diameter of the above microcapsule pigment was 2.5 µm, the complete decoloring temperature was 59° C., and the complete coloring temperature was −20° C. The pigment changed color from yellow to colorless through a change in temperature.

Preparation of Reversible Thermal Discoloration Aqueous Ink Composition

A reversible thermal discoloration aqueous ink composition was obtained by mixing 25.0 parts of the resulting microcapsule pigment (colored yellow by cooling to −20° C. or lower beforehand), 0.5 part of hydroxyethylcellulose, 0.2 part of a comb-type polymer dispersant [trade name: Solsparse 43000 manufactured by Lubrizol Japan Ltd.], 1.0 part of an organic nitrogen sulfur compound [trade name: Hokustar HP manufactured by Hokko Chemical Industry Co., Ltd.], 0.5 part of polyvinyl alcohol, 25.0 parts of glycerin, 0.02 part of a defoaming agent, and 47.78 parts of water.

The pH of the above ink composition was 6.60 and the surface tension was 40.5 mN/m.

Preparation of Inner-Wadding Type Writing Implement

An ink occlusion body prepared by coating a polyester sliver with a synthetic resin film was impregnated with the above ink composition. The resulting body was housed in a barrel made of a polypropylene resin and assembled in such a manner that the body is connected with a resin processed pen body (chisel shape) of polyester fiber mounted on the front part of the barrel. A cap was then fitted thereto, whereby an inner-wadding type writing implement (marking pen) was obtained.

An SEES resin was fitted to the rear part of the above barrel as a frictional member.

Using the resulting marking pen, a yellow letter (handwriting) was formed by writing on a sheet of paper.

The above-described handwriting was yellow at room temperature (25° C.), but the handwriting discolored and became colorless when rubbed using the frictional body fitted to the barrel. This state was kept under room temperature. When the sheet of paper was cooled to −20° C. or less, the color was returned to original yellow and the discoloration behavior was reproduced repeatedly.

Example 7

Preparation of Reversible Thermal Discoloration Microcapsule Pigment

A microcapsule pigment suspension which included a reversible thermal discoloration composition having a color-memory property and composed of 2.0 parts of 4,5,6,7-tetrachloro-3-[4-(dimethylamino)-2-methylphenyl]-3-(1-ethyl-2-methyl-1H-indol-3-yl)-1(3H)-isobenzofuranone as the component (A), 3.0 parts of 4,4'-(2-ethylhexane-1,1-diyl)diphenol, 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversible thermal discoloration microcapsule pigment.

The average particle diameter of the above microcapsule pigment was 2.5 µm, the complete decoloring temperature was 55° C., and the complete coloring temperature was −20° C. The pigment changed color from blue to colorless through a change in temperature.

Preparation of Reversible Thermal Discoloration Aqueous Ink Composition

A reversible thermal discoloration aqueous ink composition was obtained by mixing 20.0 parts of the resulting microcapsule pigment (colored blue by cooling to −20° C. or lower beforehand), 0.5 part of hydroxyethylcellulose, 0.2 part of a comb-type polymer dispersant [trade name: Solsparse 43000 manufactured by Lubrizol Japan Ltd.], 1.0 part of an organic nitrogen sulfur compound [trade name: Hokustar HP manufactured by Hokko Chemical Industry Co., Ltd.], 0.5 part of polyvinyl alcohol, 25.0 parts of glycerin, 0.02 part of a defoaming agent, and 52.78 parts of water.

The pH of the above ink composition was 6.9 and the surface tension was 41.0 mN/m.

Preparation of Inner-Wadding Type Writing Implement

An ink occlusion body prepared by coating a polyester sliver with a synthetic resin film was impregnated with the above ink composition. The resulting body was housed in a barrel made of a polypropylene resin and assembled in such a manner that the body is connected with a resin processed pen body (artillery shell shape) of polyester fiber mounted on the front part of the barrel. A cap was then fitted thereto, whereby an inner-wadding type writing implement (marking pen) was obtained.

An SEBS resin was fitted to the rear part of the above barrel as a frictional member.

Using the resulting writing implement, a blue letter (handwriting) was formed by writing on a sheet of paper.

The above-described handwriting was blue at room temperature (25° C.), but the letter discolored and became colorless when rubbed using the frictional member fitted to the barrel. This state was kept under room temperature. When the sheet of paper was cooled to −20° C. or less, the color was returned to original blue and the discoloration behavior was reproduced repeatedly.

Example 8

Preparation of Reversible Thermal Discoloration Microcapsule Pigment

A microcapsule pigment suspension which included a reversible thermal discoloration composition having a color-memory property and composed of 1.0 part of 2-(butylamino)-8-(dipentylamino)-4-methyl-spiro[5H-[1]benzopyrano[2,3-g]pyrimidine-5,1'(3'H)-isobenzofuran]-3-one as the component (A), 3.0 parts of 4,4'-(2-ethylhexane-1,1-diyl) diphenol, 5.0 parts of 2,2-bis(4'-hydroxyphenyl)-hexafluoropropane as the component (B), and 50.0 parts of 4-benzyloxyphenylethyl caprate as the component (C) was obtained.

The above suspension was centrifuged to isolate a reversible thermal discoloration microcapsule pigment.

The average particle diameter of the above microcapsule pigment was 2.3 µm, the complete decoloring temperature was 58° C., and the complete coloring temperature was −20° C. The pigment changed color from pink to colorless through a change in temperature.

Preparation of Reversible Thermal Discoloration Aqueous Ink Composition

A reversible thermal discoloration aqueous ink composition was obtained by mixing 10.0 parts of the resulting microcapsule pigment (colored pink by cooling to −20° C. or lower beforehand), 0.5 part of hydroxyethylcellulose, 0.2 part of a comb-type polymer dispersant [trade name: Solsparse 43000 manufactured by Lubrizol Japan Ltd.], 1.0 part of an organic nitrogen sulfur compound [trade name: Hokuside R-150 manufactured by Hokko Chemical Industry Co., Ltd.], 1.0 part of polyvinyl alcohol, 20.0 parts of glycerin, 0.02 part of a defoaming agent, and 67.28 parts of water.

The pH of the above ink composition was 6.90 and the surface tension was 41.0 mN/m.

Figure 6:
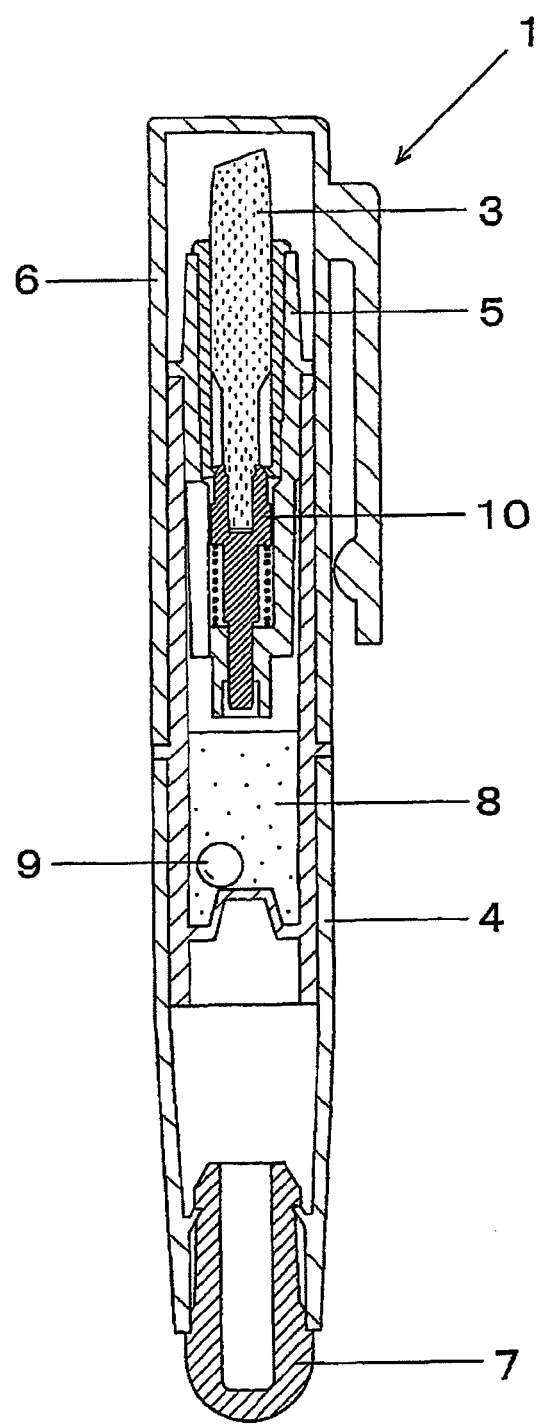
FIG. 6 is an explanatory drawing showing still another example of the writing implement of the invention.

Preparation of Direct Liquid Writing Implement (See FIG. 6)

The resulting ink 8 (which had been allowed to stand at room temperature after the microcapsule pigment had been colored pink by cooling to −20° C. or lower beforehand) and a stirring body 9 (SUS-304 ferrite-based stainless steel ball, diameter of 3 mm) were housed in a barrel 4 and a marking pen body 3 [chisel type fiber pen body (porosity, about 53%)] was attached, via a holder 5, to the front part of the barrel. A cap 6 was then fitted thereto, whereby a direct liquid writing implement 1 (marking pen) was obtained.

In this connection, a valve mechanism 10 is provided in the above barrel and the valve mechanism is composed of a valve seat, a valve body, and a metal spring which presses the above valve body so as to be pressure-welded to the valve seat and has a structure where the valve is opened by a writing force applied to the pen body at writing.

An SEBS resin was fitted to the rear part of the above barrel as a frictional member 7.

Example 9

Preparation of Reversible Thermal Discoloration Microcapsule Pigment

A microcapsule pigment suspension which included a reversible thermal discoloration composition having a color-memory property and composed of 3.0 parts of 1,3-dimethyl-6-diethylaminofluorane as the component (A), 3.0 parts of 4,4'-(2-ethylhexane-1,1-diyl)diphenol, 5.0 parts of 2,2-bis (4'-hydroxyphenyl)-hexafluoropropane as the component (B), and 50.0 parts of 4-benzyloxyphenylethyl caprate as the component (C) was obtained.

The above suspension was centrifuged to isolate a reversible thermal discoloration microcapsule pigment.

The average particle diameter of the above microcapsule pigment was 2.5 µm, the complete decoloring temperature was 60° C., and the complete coloring temperature was −20° C. The pigment changed color from orange to colorless through a change in temperature.

Preparation of Reversible Thermal Discoloration Aqueous Ink Composition

A reversible thermal discoloration aqueous ink composition was obtained by mixing 20.0 parts of the resulting microcapsule pigment (colored orange by cooling to −20° C. or lower beforehand), 0.5 part of hydroxyethylcellulose, 0.2 part of a comb-type polymer dispersant [trade name: Solsparse 43000 manufactured by Lubrizol Japan Ltd.], 1.0 part of an organic nitrogen sulfur compound [trade name: Hokuside R-150 manufactured by Hokko Chemical Industry Co., Ltd., a mixture of 2-methyl-4-isothiazolin-3-one and 5-chloro-2-methyl-4-isothiazolin-3-one], 0.5 part of polyvinyl alcohol, 25.0 parts of glycerin, 0.02 part of a defoaming agent, and 52.78 parts of water.

The pH of the above ink composition was 6.98 and the surface tension was 41.0 mN/m.

Preparation of Inner-Wadding Type Writing Implement

An ink occlusion body prepared by coating a polyester sliver with a synthetic resin film was impregnated with the above ink composition. The resulting body was housed in a barrel made of a polypropylene resin and assembled in such a manner that the body is connected with a resin processed pen body (artillery shell shape) of polyester fiber mounted on the front part of the barrel. A cap was then fitted thereto, whereby an inner-wadding type writing implement (marking pen) was obtained.

Preparation of Inner-Wadding Type Writing Implement Set

The resulting inside-filled writing implement and a rectangular frictional body made of an SEBS resin were combined to obtain an inner-wadding type writing implement set.

Using the resulting writing implement, an orange letter (handwriting) was formed by writing on a sheet of paper.

The above-described handwriting was orange at room temperature (25° C.), but the letter discolored and became colorless when rubbed using the frictional body. This state was kept under room temperature. When the sheet of paper was cooled to −20° C. or less, the color was returned to original orange and the discoloration behavior was reproduced repeatedly.

Comparative Example 1

Preparation of Reversible Thermal Discoloration Aqueous Ink Composition

A reversible thermal discoloration aqueous ink composition was obtained by mixing 20.0 parts of the reversible thermal discoloration microcapsule pigment prepared in Example 1 (colored orange by cooling to −20° C. or lower beforehand), 0.5 part of hydroxyethylcellulose, 1.0 part of an organic nitrogen sulfur compound [trade name: Hokuside R-150 manufactured by Hokko Chemical Industry Co., Ltd.], 0.5 part of polyvinyl alcohol, 25.0 parts of glycerin, 0.02 part of a defoaming agent, and 52.98 parts of water.

The pH of the above ink composition was 6.50 and the surface tension was 41 mN/m.

Preparation of Inner-Wadding Type Writing Implement

The resulting microcapsule pigment was contained in the same writing implement as in Example 1 to obtain an inner-wadding type writing implement (marking pen).

Comparative Example 2

Preparation of Reversible Thermal Discoloration Aqueous Ink Composition

A reversible thermal discoloration aqueous ink composition was obtained by mixing 20.0 parts of the reversible thermal discoloration microcapsule pigment prepared in Example 2 (colored pink by cooling to −20° C. or lower beforehand), 0.5 part of hydroxyethylcellulose, 1.0 part of an organic nitrogen sulfur compound [trade name: Hokuside 369 manufactured by Hokko Chemical Industry Co., Ltd.], 0.5 part of polyvinyl alcohol, 25.0 parts of glycerin, 0.02 part of a defoaming agent, and 52.98 parts of water.

The pH of the above ink composition was 6.40 and the surface tension was 40.5 mN/m.

Preparation of Inner-Wadding Type Writing Implement

The resulting microcapsule pigment was contained in the same writing implement as in Example 2 to obtain an inner-wadding type writing implement (marking pen).

Comparative Example 3

Preparation of Reversible Thermal Discoloration Aqueous Ink Composition

A reversible thermal discoloration aqueous ink composition was obtained by mixing 25.0 parts of the reversible thermal discoloration microcapsule pigment prepared in Example 3 (colored black by cooling to −20° C. or lower beforehand), 0.5 part of hydroxyethylcellulose, 1.0 part of an organic nitrogen sulfur compound [trade name: Hokuside NS manufactured by Hokko Chemical Industry Co., Ltd.], 0.5 part of polyvinyl alcohol, 25.0 parts of glycerin, 0.02 part of a defoaming agent, and 47.98 parts of water.

The pH of the above ink composition was 6.50 and the surface tension was 40.0 mN/m.

Preparation of Inner-Wadding Type Writing Implement

The resulting microcapsule pigment was contained in the same writing implement as in Example 3 to obtain an inner-wadding type writing implement (marking pen).

Comparative Example 4

Preparation of Reversible Thermal Discoloration Aqueous Ink Composition

A reversible thermal discoloration aqueous ink composition was obtained by mixing 25.0 parts of the reversible thermal discoloration microcapsule pigment prepared in Example 4 (colored yellow by cooling to −20° C. or lower beforehand), 0.5 part of hydroxyethylcellulose, 1.0 part of an organic nitrogen sulfur compound [trade name: Hokuside NS manufactured by Hokko Chemical Industry Co., Ltd.], 0.5 part of polyvinyl alcohol, 25.0 parts of glycerin, 0.02 part of a defoaming agent, and 47.98 parts of water.

The pH of the above ink composition was 6.20 and the surface tension was 40.5 mN/m.

Preparation of Inner-Wadding Type Writing Implement

The resulting microcapsule pigment was contained in the same writing implement as in Example 4 to obtain an inner-wadding type writing implement (marking pen).

Comparative Example 5

Preparation of Reversible Thermal Discoloration Aqueous Ink Composition

A reversible thermal discoloration aqueous ink composition was obtained by mixing 20.0 parts of the reversible thermal discoloration microcapsule pigment prepared in Example 5 (colored blue by cooling to −20° C. or lower beforehand), 0.5 part of hydroxyethylcellulose, 1.0 part of an organic nitrogen sulfur compound [trade name: Hokuside R150 manufactured by Hokko Chemical Industry Co., Ltd.], 0.5 part of polyvinyl alcohol, 25.0 parts of glycerin, 0.02 part of a defoaming agent, and 52.98 parts of water.

The pH of the above ink composition was 6.20 and the surface tension was 40.5 mN/m.

Preparation of Inner-Wadding Type Writing Implement

The resulting microcapsule pigment was contained in the same writing implement as in Example 5 to obtain an inner-wadding type writing implement (marking pen).

Comparative Example 6

Preparation of Reversible Thermal Discoloration Aqueous Ink Composition

A reversible thermal discoloration aqueous ink composition was obtained by mixing 25.0 parts of the reversible thermal discoloration microcapsule pigment prepared in Example 6 (colored yellow by cooling to −20° C. or lower beforehand), 0.5 part of hydroxyethylcellulose, 1.0 part of an organic nitrogen sulfur compound [trade name: Hokustar HP manufactured by Hokko Chemical Industry Co., Ltd.], 0.5 part of polyvinyl alcohol, 25.0 parts of glycerin, 0.02 part of a defoaming agent, and 47.98 parts of water.

The pH of the above ink composition was 6.20 and the surface tension was 40.5 mN/m.

Preparation of Inner-Wadding Type Writing Implement

The resulting microcapsule pigment was contained in the same writing implement as in Example 6 to obtain an inner-wadding type writing implement (marking pen).

Comparative Example 7

Preparation of Reversible Thermal Discoloration Aqueous Ink Composition

A reversible thermal discoloration aqueous ink composition was obtained by mixing 25.0 parts of the reversible thermal discoloration microcapsule pigment prepared in Example 7 (colored blue by cooling to −20° C. or lower beforehand), 0.5 part of hydroxyethylcellulose, 1.0 part of an organic nitrogen sulfur compound [trade name: Hokustar HP manufactured by Hokko Chemical Industry Co., Ltd.], 0.5 part of polyvinyl alcohol, 25.0 parts of glycerin, 0.02 part of a defoaming agent, and 52.98 parts of water.

The pH of the above ink composition was 6.20 and the surface tension was 40.5 mN/m.

Preparation of Inner-Wadding Type Writing Implement

The resulting microcapsule pigment was contained in the same writing implement as in Example 7 to obtain an inner-wadding type writing implement (marking pen).

Comparative Example 8

Preparation of Reversible Thermal Discoloration Aqueous Ink Composition

A reversible thermal discoloration aqueous ink composition was obtained by mixing 10.0 parts of the reversible thermal discoloration microcapsule pigment prepared in Example 8 (colored pink by cooling to −20° C. or lower beforehand), 0.5 part of hydroxyethylcellulose, 1.0 part of an organic nitrogen sulfur compound [trade name: Hokuside R-150 manufactured by Hokko Chemical Industry Co., Ltd.], 1.0 part of polyvinyl alcohol, 20.0 parts of glycerin, 0.02 part of a defoaming agent, and 67.48 parts of water.

The pH of the above ink composition was 6.10 and the surface tension was 40.5 mN/m.

Preparation of Direct Liquid Type Writing Implement

The resulting microcapsule pigment was contained in the same writing implement as in Example 8 to obtain a direct liquid writing implement (marking pen).

Using the writing implement obtained in each of the above Examples and Comparative Examples, the following test was conducted.

Vibration Test

Using the writing implement obtained in each of Examples 1 to 7 and Comparative Examples 1 to 7, a line having a length of 20 cm was written ten times as ten lines on a writing paper.

Its cap was fitted to the writing implement used for writing and it was set on a shaker [recipro-shaker manufactured by Taitec Corporation] in an erecting state (the writing front part was upward). After vibration was imparted at 284 rpm for 5 hours in a vertical direction, a line having a length of 20 cm was written ten times as ten lines on a writing paper and the handwriting was compared with the handwriting before the test.

The following table shows the results of the writing test.

TABLE 1

|  | Example | | | | | | | Comparative Example | | | | | | |
| --- | --- | --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 | 6 | 7 |
| Vibration test | o | o | o | o | o | o | o | x | x | x | x | x | x | x |

The evaluation on the symbols in the table is as follows:
o: faint and patchy parts are not observed on the handwriting as compared with the initial one and it has the same color density as that of the initial one;
x: faint and patchy parts are observed at the start of writing and the handwriting density is reduced as compared with the initial density.

Aging Test

Using each two writing implements prepared in Example 8 and Comparative Example 8, a line having a length of 20 cm was written ten times as ten lines on a writing paper with each writing implement.

Its cap was fitted to the writing implement used for writing and it was allowed to stand in an erecting state (the writing front part was upward) at 25° C. for 30 days for one writing implement or at 50° C. for 30 days for another writing implement. Thereafter, a line having a length of 20 cm was written ten times as ten lines on a writing paper and the handwriting was compared with the handwriting before the test.

The following table shows the results of the writing test.

TABLE 2

|  |  | Example 8 | Comparative Example 8 |
| --- | --- | --- | --- |
| Aging test | 25° C., 30 days | O | X |
|  | 50° C., 30 days | O | X |

The evaluation on the symbols in the table is as follows:
O: faint and patchy parts are not observed on the handwriting as compared with the initial one and it has the same color density as that of the initial one;
x: faint and patchy parts are observed at the start of writing and the handwriting density is reduced as compared with the initial density.

While the invention has been described in detail and with reference to specific embodiments thereof, it will be apparent to one skilled in the art that various changes and modifications can be made therein without departing from the spirit and scope thereof.

This application is based on a Japanese patent application No. 2008-049303 filed on Feb. 29, 2008, and Japanese Patent Application No. 2008-190422 filed on Jul. 24, 2008, and the contents thereof are herein incorporated by reference.

INDUSTRIAL APPLICABILITY

The invention can provide a reversible thermal discoloration aqueous ink composition which is capable of suppressing the lightening and deepening of handwriting at the time when a writing implement containing the reversible thermal discoloration aqueous ink composition in the barrel is used, and particularly, which does not lighten the color of handwriting with time in an erecting state or does not lighten the color of handwriting by the application of vibration at transportation or at the time when it is carried on in an erecting state, as well as a writing implement using the same and a writing implement set.

The invention claimed is:

1. A reversible thermal discoloration aqueous ink composition comprising:
    water,
    a reversible thermal discoloration microcapsule pigment including a reversible thermal discoloration composition comprising:
        (A) an electron donative coloring organic compound,
        (B) an electron accepting compound, and
        (C) a reaction medium which determines a temperature at which color reactions of the both compounds occur,
    a polymer flocculant,
    a comb-type polymer dispersant having a carboxyl group at the side chain,
    an organic nitrogen sulfur compound, and
    a water-soluble resin.

2. The reversible thermal discoloration aqueous ink composition according to claim 1, wherein the organic nitrogen sulfur compound is a compound selected from 2-(4-thiazoyl)-benzimidazole, 2-(thiocyanatomethylthio)-1,3-benzothiazole, 2-methyl-4-isothiazolin-3-one, and 5-chloro-2-methyl-4-isothiazolin-3-one.

3. The reversible thermal discoloration aqueous ink composition according to claim 1, wherein the mass ratio of the comb-type polymer dispersant having a carboxyl group at the side chain to the organic nitrogen sulfur compound is from 1:1 to 1:10.

4. The reversible thermal discoloration aqueous ink composition according to claim 1, wherein the pH of the ink composition falls within the range of 3 to 7.

5. The reversible thermal discoloration aqueous ink composition according to claim 4, which uses a water-soluble resin soluble in the range wherein the pH of the ink composition is from 3 to 7.

6. The reversible thermal discoloration aqueous ink composition according to claim 5, wherein the water-soluble resin is polyvinyl alcohol.

7. The reversible thermal discoloration aqueous ink composition according to claim 6, wherein the saponification degree of the polyvinyl alcohol is from 70% to 89%.

8. The reversible thermal discoloration aqueous ink composition according to claim 5, which contains the water-soluble resin in an amount of 0.3 to 3.0% by mass.

9. The reversible thermal discoloration aqueous ink composition according to claim 1, wherein the surface tension of the ink composition falls within the range of 25 to 45 mN/m.

10. A writing implement equipped with a pen body containing the reversible thermal discoloration aqueous ink composition according to claim 1 in a barrel and leading out the ink composition in the barrel.

11. The writing implement according to claim 10, wherein a rear portion of the pen body comes into contact with an ink occlusion body composed of a fiber collective body contained in the barrel and the ink occlusion body is impregnated with the ink composition.

12. The writing implement according to claim 10, wherein the pen body is a marking pen.

13. The writing implement according to claim 10, which is equipped with a frictional member.

14. A writing implement set comprising the writing implement according to claim 10 and a frictional body.

* * * * *